(12) United States Patent
Su et al.

(10) Patent No.: US 7,882,355 B2
(45) Date of Patent: Feb. 1, 2011

(54) ENCRYPTION/DECRYPTION METHODS AND DEVICES UTILIZING THE SAME

(75) Inventors: Haw-Kuen Su, Taipei (TW); Pei-Chieh Hu, Taipei (TW); Meng-Huang Chu, Taipei (TW)

(73) Assignee: Tian Holdings, LLC, Wilmington, DE (US)

(*) Notice: Subject to any disclaimer, the term of this patent is extended or adjusted under 35 U.S.C. 154(b) by 1567 days.

(21) Appl. No.: 11/167,853

(22) Filed: Jun. 27, 2005

(65) Prior Publication Data

US 2006/0031687 A1    Feb. 9, 2006

(30) Foreign Application Priority Data

Aug. 3, 2004    (CN) .................. 2004 1 0055979

(51) Int. Cl.
   H04L 29/06       (2006.01)
   H04K 1/00        (2006.01)
   G06F 11/30       (2006.01)
   G11C 29/00       (2006.01)
   H04L 9/00        (2006.01)
   G11C 11/34       (2006.01)
   H04L 9/28        (2006.01)
   G06F 21/00       (2006.01)

(52) U.S. Cl. .................. 713/167; 713/190; 713/193; 380/255; 714/702

(58) Field of Classification Search ............. 713/167, 713/190; 380/255; 714/702
See application file for complete search history.

(56) References Cited

U.S. PATENT DOCUMENTS 5,369,641 A * 11/1994 Dodt et al. ............... 714/702
2003/0200453 A1 * 10/2003 Foster et al. ............ 713/200

FOREIGN PATENT DOCUMENTS

| CN | 1154512 | 7/1997 |
| CN | 1588328 | 3/2005 |
| CN | 09420230740 | 3/2005 |
| EP | 768601 A1 * | 4/1997 |

OTHER PUBLICATIONS

Paul Kocher, Ruby Lee, Gary McGraw, Anand Raghunathan / Srivaths Ravi, "Security as a new dimension in embedded system design", Jun. 2004, DAC '04: Proceedings of the 41st annual Design Automation Conference, Publisher: ACM, pp. 753-760.*

* cited by examiner

Primary Examiner—Matthew B Smithers
Assistant Examiner—Courtney D Fields

(57) ABSTRACT

An encryption/decryption method and devices for protecting data in a memory device from unauthorized access is provided. First, obtaining a specific code from a memory device and then encrypting the specific code and original data for obtaining encrypted data during a write cycle. Finally, writing the encrypted data to the memory device according to an access address. The access address can be also encrypted to generate the encrypted data. The encryption level increases by this way so that the valuable information is under protection.

19 Claims, 2 Drawing Sheets

ENCRYPTION/DECRYPTION METHODS AND DEVICES UTILIZING THE SAME

BACKGROUND

The disclosure relates to encryption/decryption methods, and more particularly to encryption/decryption methods for a memory device.

For optimizing peripheral add-on cards, control chips of such cards typically require that dedicated drivers or applications run properly under operating systems of host computers. It is also noted that recently integrated circuit (IC) design has a tendency towards multi-function and System-On-Chip (SOC) implementation to fulfill various client requirements.

Accordingly, the control chips of peripheral add-on cards are generally provided with a non-volatile memory interface to access customized code and information in a non-volatile memory under control of the dedicated drivers or applications. As a result, peripheral add-on card vendors may differentiate their products for a variety of target markets by different programming and definition.

Nevertheless, traditional ways lack a secure mechanism to read/write non-volatile memories. Because there is no encryption mechanism, critical data and codes in the non-volatile memory are vulnerable to reverse engineering and illegal copy. If unauthorized access to such valuable information has occurred, data stored in the peripheral add-on card is easily available to unauthorized users.

SUMMARY

Encryption/decryption methods and devices for a memory device are provided. An embodiment of an encryption/decryption method comprises obtaining a specific code from a memory device, encrypting the specific code and first data for obtaining encrypted data during a write cycle, and writing the encrypted data to the memory device according to an access address, wherein the memory device comprises the specific code and the encrypted data.

An embodiment of an encryption/decryption device comprises a memory device comprising a specific code, and a processor coupled to the memory device. The processor encrypts the specific code and first data for obtaining encrypted data and storing the encrypted data to the memory device according to an access address during a write cycle.

BRIEF DESCRIPTION OF THE DRAWINGS

The invention can be more fully understood by reading the subsequent detailed description and examples with reference made to the accompanying drawings, wherein.

DETAILED DESCRIPTION

Figure 1:
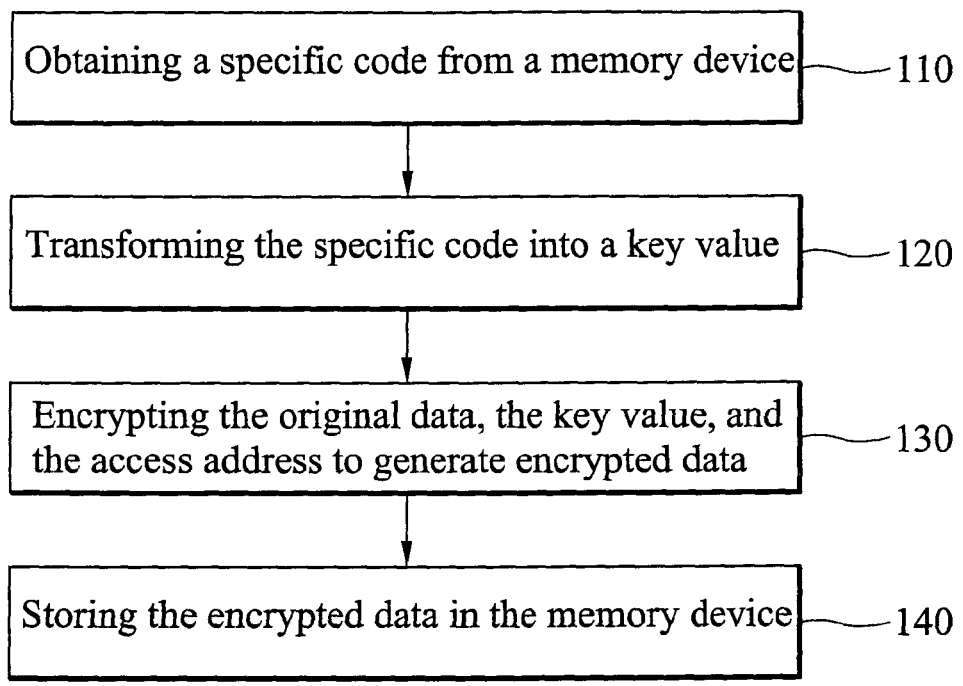
FIG. 1 is a flowchart of an encryption method according to an embodiment of the invention.

FIG. 1 is a flowchart of an encryption method according to an embodiment of the invention. First, to store data in a memory device during a write cycle, a specific code is obtained from the memory device in step 110. Before the memory device leaves the factory, a manufacturer stores a specific code therein. The specific code can be a serial number of the memory device or the date of production. Memory devices from different manufacturers may have different specific code. Additionally, different memory devices manufactured at the same time also have different serial numbers. The bit length of the specific code can be any length, such as 32 bits, 64 bits, 128 bits, or 256 bits.

To increase encryption level, the specific code is transformed into a first key value in step 120. For example, a specific code of 256 bits is transformed into a first key value of 32 bits by a transformation program. The encryption level increases with difference between the specific code and the first key value bit counts.

Next, original data, the first key value, and an access address are encrypted in step 130. Embodiments of the invention can utilize any encryption to encrypt the original data, the first key value, and the access address for generating encrypted data. Since different memory devices have different specific code, their encrypted data is different. Thus, different encrypted data is generated for the same original data to be stored in the same address of different memory devices, so the encryption level increases.

Since the access address and the original data are simultaneously encrypted, different encrypted data related to the same original data is generated by different access addresses after encryption. For example, as original data 00 is respectively stored to access addresses 0000H~0005H, the original data 00 can be transformed to 00~05 and stored in the access addresses 0000H~0005H after the encryption, so the encryption level increases. In another embodiment, the invention can only encrypt the first key value and the original data such that the same encrypted data is generated when the same original data is encrypted.

The encrypted data is stored in the memory device according to the access address in step 140. Thus, the specific code and the encrypted data are stored in the memory device. Since the stored data in the memory device is encrypted, the security of the original data is increased.

Figure 2:
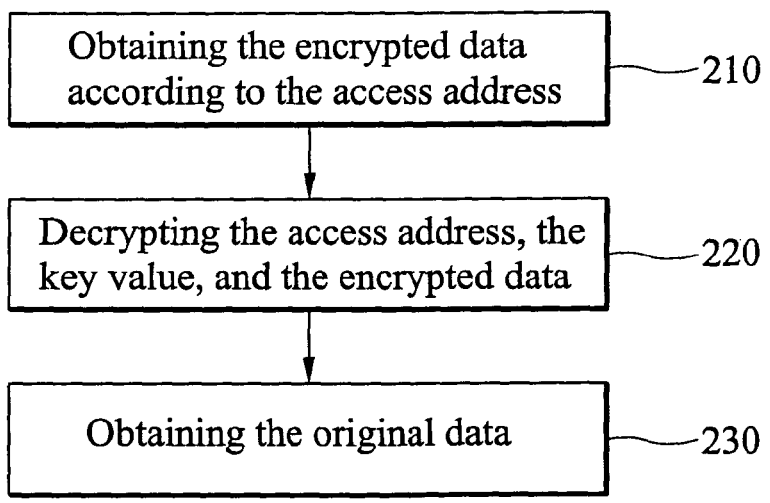
FIG. 2 is a flowchart of a decryption method according to an embodiment of the invention.

FIG. 2 is a flowchart of a decryption method according to an embodiment of the invention. In a read cycle, the encrypted data stored in the memory device is read according to the access address in step 210. Since the encrypted data stored in the memory device has been encrypted, the encrypted data needs to decrypt to obtain the original data.

Next, the encrypted data, a second key value, and an access address are decrypted in step 220. Since the original data, the first key value, and the access address are encrypted in step 130, the encrypted data, the second key value, and the access address are simultaneously decrypted to obtain the original data. In an embodiment, the first key value equals the second key value.

A decryption utilized in the decryption method needs to match an encryption utilized in the encryption method, since data operations are complementary. For example, the decryption does not need to decrypt with the access address when the access address is not encrypted during the encryption.

After the encrypted data stored in the memory device is decrypted, the original data can be obtained in step 230.

Figure 3:
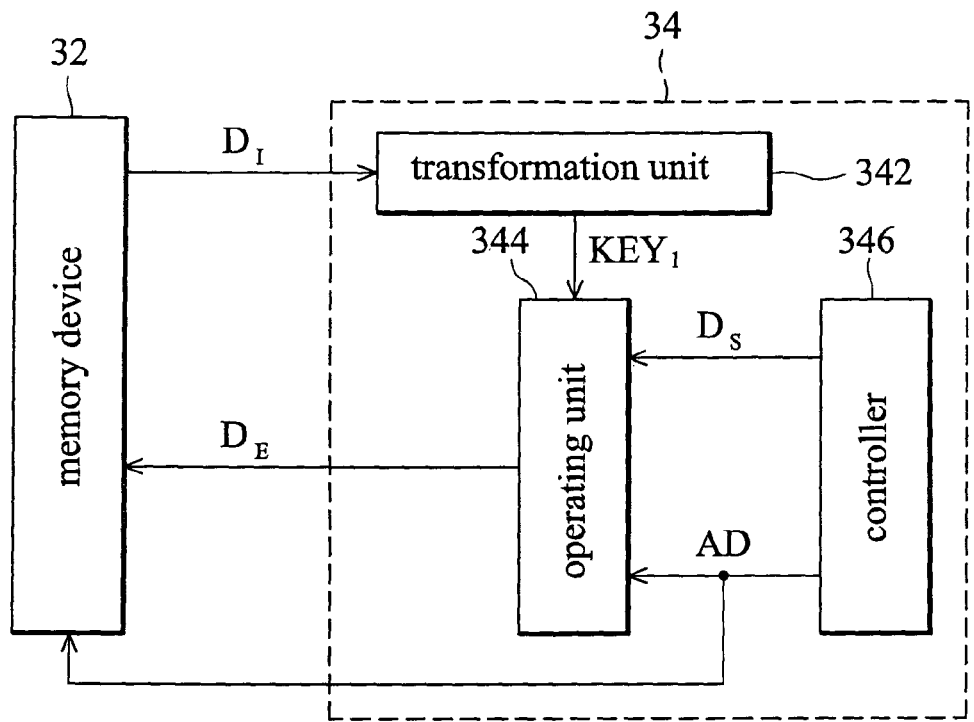
FIG. 3 shows an encryption circuit according to an embodiment of the invention.

FIG. 3 shows an encryption circuit according to an embodiment of the invention. In a write cycle, a processor 34 encrypts an original data to obtain encrypted data stored in a memory device 32 to ensure security of the original data. The memory device 32 can be a flash read only memory (Flash ROM) or other ROM. The processor 34 comprises a transformation unit 342, an operating unit 344, and a controller 346. The transformation unit 342 transforms a specific code $D_I$ stored in the memory device 32 to a first key value $KEY_1$. In an embodiment, the transformation unit 342 transforms the bit length from 256 bits into 32 bits.

As difference in bit count between the specific code $D_I$ and the first key value $KEY_1$ increases, encryption level does commensurately. The transformation unit 342 can be omitted.

The controller 346 outputs an original data $D_S$ and access address AD to the operating unit 344. The processor 34, to store data in the memory device 32, directs the operating unit 344 to perform encryption. The method for encrypting operation according to the invention is not restricted. The first key value $KEY_1$, the original data $D_S$, and the access address AD are encrypted by the operating unit 344 to generate encrypted data $D_E$. The operating unit 344 stores the encrypted data $D_E$ in the memory device 32 according to the access address AD. Thus, the memory device 32 comprises the specific code $D_I$ and the encrypted data $D_E$.

Additionally, to increase encryption level, the encryption performed by the operating unit 344 encrypts with the access address. In another embodiment, the encryption of access address can be omitted. As an example, encryption with the access address, as the same original-data is to be stored in the memory device 32 at different access addresses, the different encrypted data will be generated after encryption.

Figure 4:
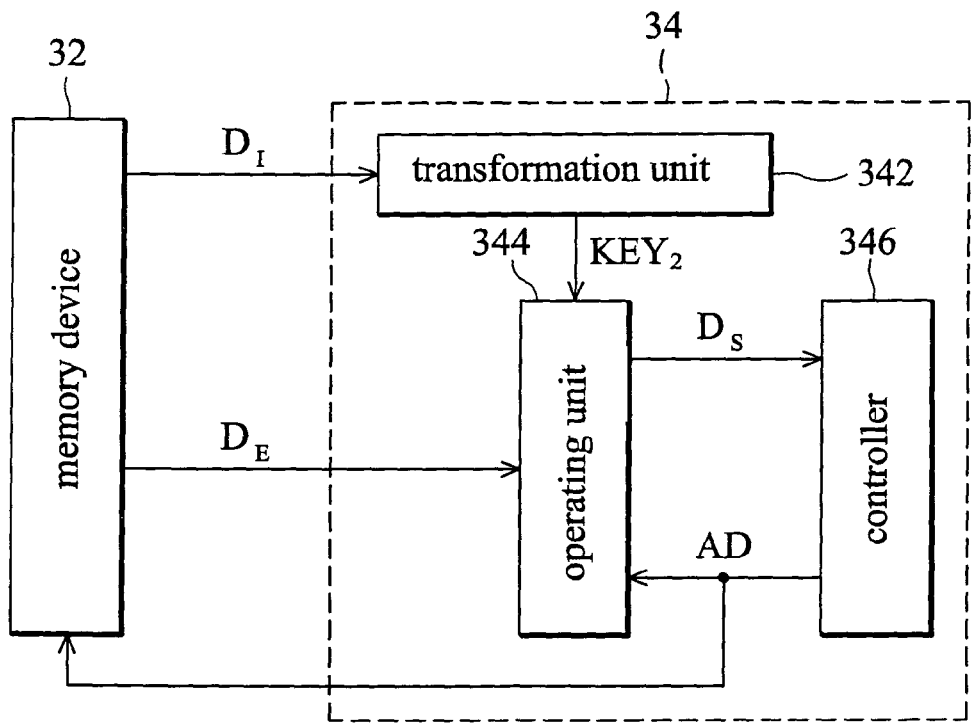
FIG. 4 shows a decryption circuit according to an embodiment of the invention.

FIG. 4 shows a decryption circuit according to an embodiment of the invention. The circuit in FIG. 4 is similar to the circuit in FIG. 3. The operating unit 344 in FIG. 4 performs decryption to read the encrypted data stored in the memory device 32 in a read cycle.

The transformation unit 342 transforms the specific code $D_I$ stored in the memory device 32 to a second key value $KEY_2$ that equals the first key value $KEY_1$. The operating unit 344 reads the encrypted data $D_E$ from the memory device 32 according to the access address AD provided from the controller 346. The encryption encrypted with the access address AD shown in FIG. 3, so the second key value $KEY_2$, the access address AD, and encrypted data $D_E$ are decrypted by the operating unit 344 to obtain the original data $D_S$. The controller 346 performs other operations according to the original data $D_S$.

Advantages of embodiments according to the invention are summarized in the following. Data stored in the memory device is encrypted, so it prevents unauthorized access. If different key values with the same original data are encrypted, the encrypted data is different, such that memory devices with different specific code store different encrypted data. Since the encryption according to the embodiment of the invention encrypts with the access address, when the same original data is stored in different access addresses, the encrypted data stored in different access addresses are different for increased encryption level.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An encryption/decryption method for a memory device, comprising:
   obtaining a specific code from the memory device;
   encrypting the specific code and first data to obtain encrypted data during a write cycle; and writing the encrypted data to the memory device according to an access address, wherein the first data comprises original data to be stored in the memory device and the access address.

2. The encryption/decryption method as claimed in claim 1, further comprising:
   transforming the specific code to obtain a key value; and
   encrypting the key value and the first data to obtain the encrypted data during the write cycle.

3. The encryption/decryption method as claimed in claim 2, further comprising:
   reading the encrypted data according to the access address during a read cycle; and
   decrypting the encrypted data and the key value to obtain the original data.

4. The encryption/decryption method as claimed in claim 2, further comprising:
   reading the encrypted data according to the access address during a read cycle; and
   decrypting the encrypted data, the key value, and the access address to obtain the original data.

5. The encryption/decryption method as claimed in claim 1, wherein the specific code is set by a producer of the memory device.

6. The encryption/decryption method as claimed in claim 5, wherein the specific code is a serial number of the memory device.

7. The encryption/decryption method as claimed in claim 1, wherein different memory devices comprise different specific code.

8. An encryption/decryption device comprising:
   a memory device comprising a specific code; and
   a processor coupled to the memory device and configured to encrypt the specific code and first data to obtain encrypted data and to store the encrypted data to the memory device according to an access address during a write cycle.

9. The encryption/decryption device as claimed in claim 8, wherein the processor is configured to transform the specific code to a key value and encrypts the key value with the first data.

10. The encryption/decryption device as claimed in claim 9, wherein the first data is original data to be stored in-the memory device.

11. The encryption/decryption device as claimed in claim 10, wherein the processor is configured to read the encrypted data stored in the memory device according to the access address and decrypts the encrypted data and the key value to obtain the original data during a read cycle.

12. The encryption/decryption device as claimed in claim 9, wherein the first data comprises the access address and original data to be stored in the memory device.

13. The encryption/decryption device as claimed in claim 12, wherein the processor is configured to read the encrypted data from the memory device according to the access address and decrypts the encrypted data, the key value, and the access address to obtain the original data during a read cycle.

14. The encryption/decryption device as claimed in claim 9, wherein the processor comprises:
   a transformation unit means for transforming the specific code to the key value;
   a controller means for outputting the first data during the write cycle; and
   an operating unit means for encrypting the key value and the first data.

15. The encryption/decryption device as claimed in claim 8, wherein the specific code is set by a producer of the memory device.

16. The encryption/decryption device as claimed in claim 15, wherein the specific code is a serial number of the memory device.

17. The encryption/decryption device as claimed in claim 8, wherein different memory devices are manufactured with different specific codes.

18. The encryption/decryption device as claimed in claim 8, wherein the memory device is a read only memory (ROM).

19. An encryption/decryption apparatus for a memory device, comprising:
- means for obtaining a specific code from the memory device;
- means for encrypting the specific code and first data to obtain encrypted data during a write cycle; and
- means for writing the encrypted data to the memory device according to an access address during a write cycle.

* * * * *

UNITED STATES PATENT AND TRADEMARK OFFICE
CERTIFICATE OF CORRECTION

| | | |
|---|---|---|
| PATENT NO. | : 7,882,355 B2 | Page 1 of 1 |
| APPLICATION NO. | : 11/167853 | |
| DATED | : February 1, 2011 | |
| INVENTOR(S) | : Su et al. | |

It is certified that error appears in the above-identified patent and that said Letters Patent is hereby corrected as shown below:

Column 4, line 44, in Claim 10, delete "in-the" and insert -- in the --.

Signed and Sealed this
Thirty-first Day of May, 2011

David J. Kappos
*Director of the United States Patent and Trademark Office*